Dec. 11, 1923.
C. J. WALDEN
PIMIENTO CORING AND SKIN LOOSENING MACHINE
Filed Jan. 3, 1923
1,476,937
3 Sheets-Sheet 1
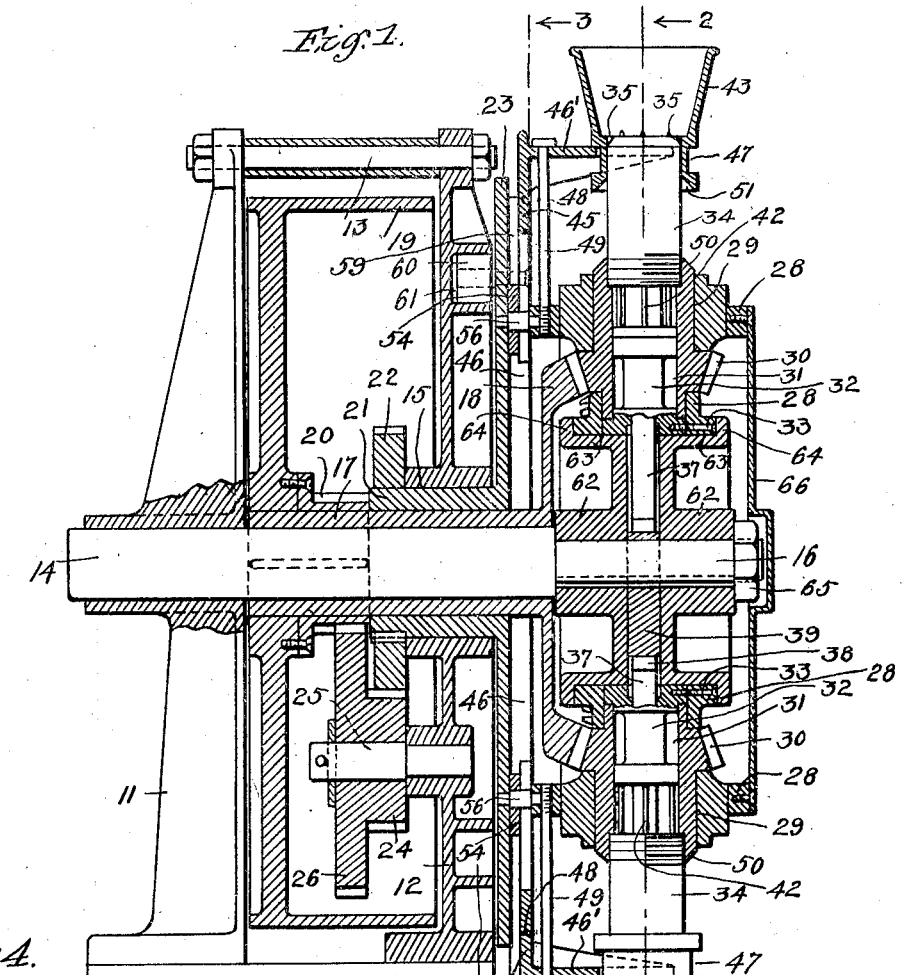
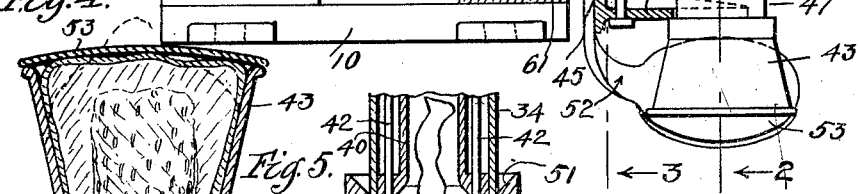
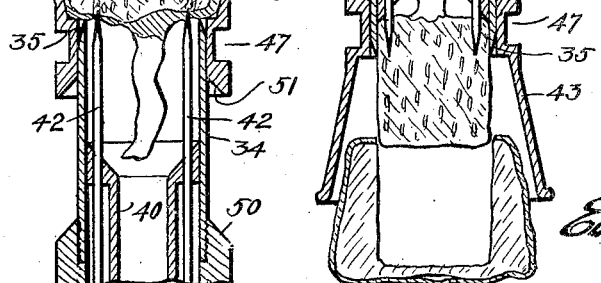
INVENTOR.
Cecil J. Walden
BY
ATTORNEY.

Dec. 11, 1923.  
C. J. WALDEN  
1,476,937  
PIMIENTO CORING AND SKIN LOOSENING MACHINE  
Filed Jan. 3, 1923  3 Sheets-Sheet 2
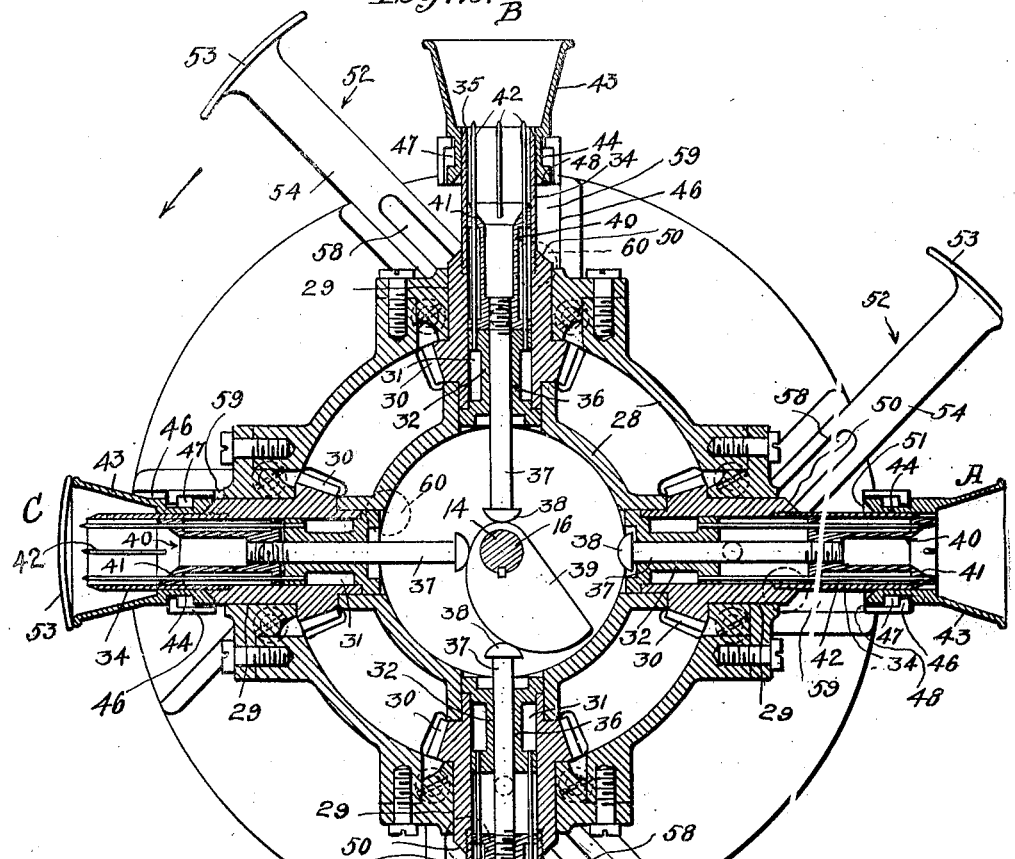
INVENTOR.  
Cecil J. Walden  
BY  
Edmund A. Thauro  
ATTORNEY.

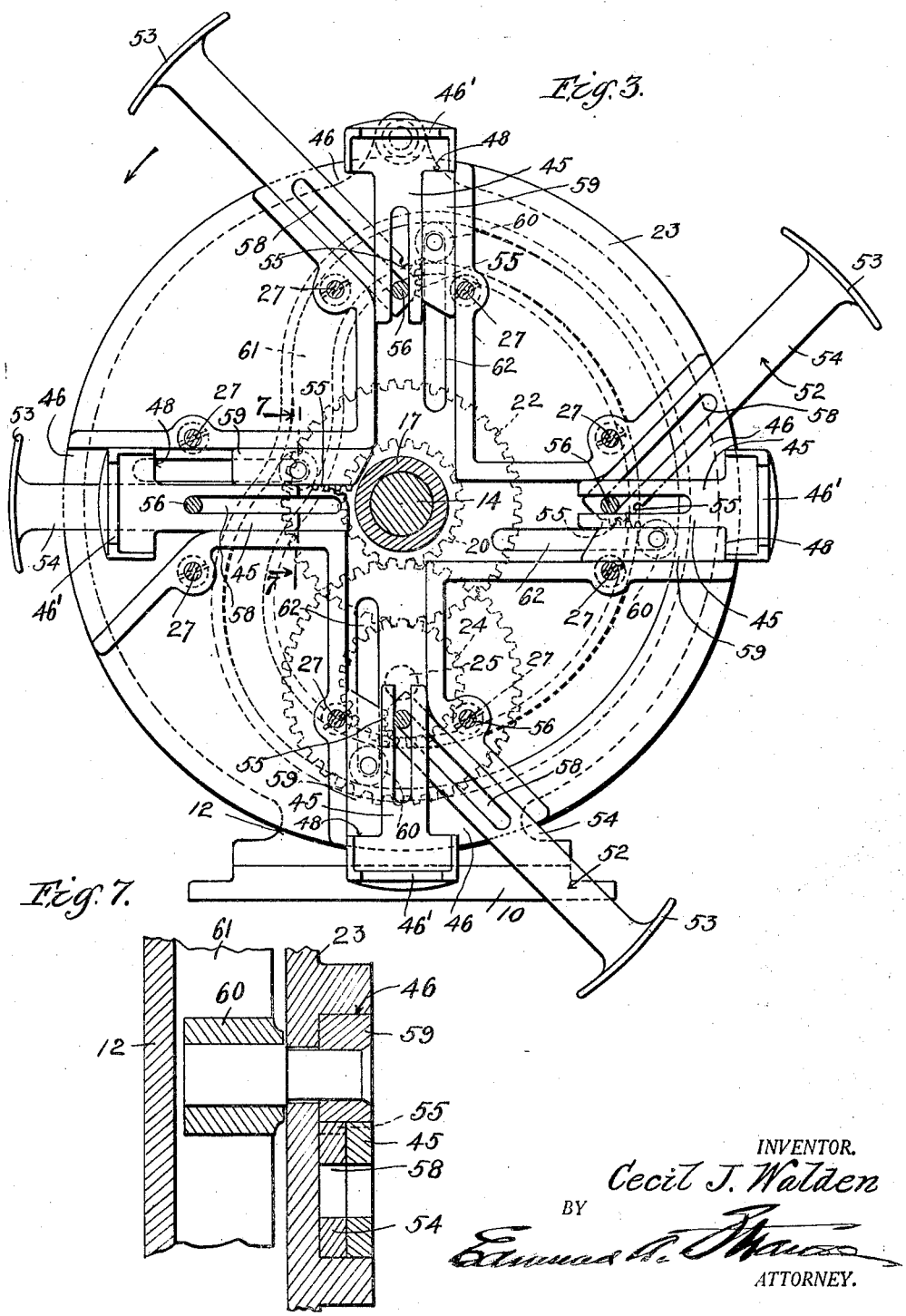

Patented Dec. 11, 1923.

1,476,937

UNITED STATES PATENT OFFICE.

CECIL J. WALDEN, OF LOS ANGELES, CALIFORNIA.

PIMIENTO CORING AND SKIN-LOOSENING MACHINE.

Application filed January 3, 1923. Serial No. 610,430.

*To all whom it may concern:*

Be it known that I, CECIL JOHN WALDEN, a citizen of the United States, residing at Los Angeles, in the county of Los Angeles and State of California, have invented new and useful Improvements in Pimiento Coring and Skin-Loosening Machines, of which the following is a specification.

My invention relates to a pimiento coring and skin loosening machine which is designed to be automatic in operation to separate the core from the meat and skin from the fruit, and to deposit them in different receptacles.

It is the object of my invention to provide a machine for the purpose above described which will be simple and durable in construction and efficient and rapid in operation, thereby reducing to a minimum the expense of preparing the fruit for commercial purposes.

Another object of my invention is to provide a novel means for driving the various mechanisms at variable speeds, and to enclose the various working parts in order that particles of the pimiento may not become entangled therein as well as to protect the operator from injury.

The above and other objects will be more fully described in the following specification, reference being had to the accompanying drawings, forming a part thereof, in which:

Fig. 1 is a longitudinal section through a machine embodying my invention.

Fig. 2 is a section through the same taken on the line 2—2 of Fig. 1 viewed in the direction indicated by the arrows.

Fig. 3 is a section taken on the line 3—3 of Fig. 1 viewed in the direction indicated by the arrows.

Figs. 4, 5 and 6 are enlarged sectional views illustrating various steps in the process of coring the fruit and ejecting the same from the machine.

Fig. 7 is an enlarged fragmental sectional view taken on the line 7—7 of Fig. 3 viewed in the direction indicated by the arrows.

In carrying out my invention 10 represents a suitable base, adapted to be secured to a table or bench, from which projects upwardly a pair of oppositely disposed standards 11 and 12 which are secured together at their upper ends by means of a spacing bolt 13. The standard 11 has secured thereto a forwardly projecting stud shaft 14 which passes through a bore 15 formed in the standard 12, and is reduced in diameter at its free end as at 16.

Rotatably journaled on stud shaft 14 is a hub 17 having formed on its forward end a bevel gear 18, and secured to its rear end a pulley 19 and a pinion 20.

Mounted for rotation on the hub 17, and passing through the bore 15 of standard 12 is a hub 21 having secured to its rear end a gear 22 and to its forward end a disc 23. The gear 22 is adapted to mesh with a gear 24 journaled on a stud 25 secured to the standard 12, and secured to said gear and adapted to rotate in unison therewith is another gear 26 which meshes with the pinion 20.

By the above recited construction it will be obvious that when power is applied to the drive pulley 19, the gear 18 will be rotated and through the medium of the gears 20, 25, 24 and 22, the disc 23 will be rotated in the same direction but at slower speed.

Surrounding shaft 16 and secured to the disc 23 by means of the screws 27 is a casing 28, provided with a plurality of radially disposed bores 29 in which are journaled the hubs of pinions 30 adapted to mesh with bevel gear 18. The pinions 30 are provided with centrally disposed bores 31 into which projects the radially disposed mandrels 32 secured to the casing 28 by means of the screws 33.

Threaded into the bores 31 of pinions 30, and adapted to rotate therewith, are the outwardly extending coring knives 34 which comprise cylindrical tubes sharpened at 35 on their outwardly projecting ends. The mandrels 32 are provided with centrally disposed bores 36 in which the stems 37 are adapted to slide, said stems being provided at their inner ends with buttons 38 adapted to engage with the cam 39, keyed to the shaft 16, and at their outer ends secured to the core ejector members 40, said ejector members comprising tubes, which are provided with funnels 41 at their outer ends, adapted to slide in the bores of knives 34.

Extending from the outer ends of mandrels 32 are a plurality of spikes or pins 42 adapted to project through apertures in the walls of funnels 41 and at predetermined times to project into the core of the fruit, to hold it centrally disposed with respect to the coring knife and also from rotation when the coring knife is performing its function.

A plurality of fruit receiving cups 43 adapted to guide and position the fruit to dispose the core thereof centrally with respect to the core holding spikes and coring knives, provided with inwardly projecting hollow stems 44, are slidably mounted on the tubular knives 34 and are moved thereon by means of arms 45, guided in ways 46 formed in disc 23, the outer ends of said arms being provided with yokes 46' adapted to engage in grooves 47 formed in the stems 44 of cups 43. The arms 45 are limited in their outward movement by means of the heads of the bolts 49 secured to the casing 28, said bolts passing through apertures in the yokes 46', and the heads thereof engaging with said yokes for this purpose. The outer ends of the hubs of pinions 30 are tapered as at 50 and the inner ends of stems 44 are provided with corresponding tapered cavities 51 in order that a frictional engagement between these members may be had at a predetermined interval during the cycle of operation, and thereby revolve the cups in unison with the coring knives.

The guide cups 43 are adapted to guide the pimientos to be prepared, and dispose the cores thereof centrally with respect to the spikes and coring knives, and to be pressed down on the same at predetermined intervals by pull on members 52, which comprise a cover 53 attached to a bar 54, said bar being provided with rack teeth 55 at their inner ends and adapted to project into the ways 46 formed in the disc 23, and to be guided by means of pins 56 secured in and between the casing 28 and the disc 23, which pass through slots 58 in said bars. Rack bars 59 which engage with the teeth 55 of bar 54 are adapted to slide in the ways 46, and are provided with rollers 60 which engage in a cam groove 61 formed in disc 23, the bearing studs of said rollers passing through slots 62 in said disc.

The outer ends of the bars 59 are adapted to engage with the shoulders 48 (see Fig. 3) of the arms 45 to positively force the guide cups outwardly and hold them in this position during the time the pimientos are being positioned with respect to the holding spikes and coring knives, thereby eliminating the danger of the fingers of the operator becoming punctured or cut by the same.

By the above recited construction it will be obvious that upon rotation of the casing 28 and disc 23, the rack bars 59 will be actuated by means of the cam groove 61, and in turn will actuate the pull on members to cause the covers 53 to be automatically thrown over the guide cups 43 and the pimiento contained therein, and will then push the pimiento onto the spikes and coring knives, and at the same time push the cups inwardly in sliding relation with the knives 34, thereby impaling the core of the pimiento on the spikes and cutting the meat from the core, and that this motion will be reversed during a cycle of operation.

In order that the casing 28 may be more effectively supported, a pair of collars 62 are keyed to the shaft end 16 and disposed on opposite sides of the cam 39, the casing 28 being provided with a centrally disposed bore 63 which surrounds the peripheries of said collars, thus relieving the bearing strain on the hub 21 of disc 23. The collars 62 are provided with flanges 64 between which the casing 28 is guided, and said collars are held in position by means of the nut 65 which is threaded on the end of stud shaft 16.

A disc plate 66 is secured to the front surface of the casing 26, in order that the gears 30 and other working parts may be protected from fragments of the pimientos as well as to afford protection of the operator from becoming entangled in the gears.

Before the pimientos are operated upon to be cored and otherwise prepared, they are first treated by boiling the same in oil at a high temperature; this tends to loosen the skin from the flesh or meat at all parts of the fruit with the exception of a small area at its blossom end, the loosening of the skin at the blossom end being provided for in the mechanism of the machine and will be described in the following recital of its mode of operation.

In the operation of the machine the casing 28 carrying the guide cups and other mechanism, is caused to rotate at a slow speed in the direction indicated by the arrows in Figs. 2 and 3 of the drawings, through the medium of the pulley 19 and the train of gears previously described, said pulley being belted to a source of power, not shown. The knives 34 are caused to rotate at a high speed through their engagement with the bevel gear 18, which is secured to the pulley 19.

While the cups or holders are passing between positions A and B, (see Fig. 2) the pimientos are placed therein with the stems, if any, inserted into the tubular core ejectors 40, as shown in Fig. 4 of the drawings, and are impaled on the extreme ends of the spikes 42, the ejector members 40 sliding inwardly during this operation. As the cups travel between the positions B and C (see Fig. 2), the bar 54 is actuated by means of the cam groove 61 and intermediate mechanism to project the covers 53 over the cups containing the pimientos, and are then pulled inwardly toward the center of rotation, thus forcing the pimientos inwardly on to the knives 34 and the cores thereof more firmly on to the spikes or pins 42, the spikes or pins holding the pimiento from rotation while the knives cut around the core. When the cups reach their innermost position, frictional contact is then made between the tapered ends 50 of the hubs of pinions 30 and the surface of the tapered concavities 51 of the hollow stems 44 formed on the lower ends of the cups 43, thus causing the cups to rotate a few times, and as the core is held in a stationary position by means of the spikes or pins 42, and the blossom end of the pimiento is held stationary by frictional contact with the cover, the skin and the meat of the pimiento is caused to rotate, thus twisting out the core and at the same time forcibly rubbing the blossom end against the cover to loosen the skin from the meat at this point. While the cups are passing from C to D (see Fig. 2), they are moved outwardly and the covers 53 are moved from their path, thus separating the meat and skin from the core, and permitting them to drop from the cups, as shown in Fig. 5 of the drawings. While the cups are moving between positions D and A (see Fig. 2), the ejectors 40 are caused to move outwardly by means of the cam 39 and strip the cores from the spikes 42 and eject them from the cups, as clearly shown in Fig. 6 of the drawings.

By this mode of operation it will be obvious that the mechanism may be so timed as to cause the skin and meat of the fruit to be automatically dropped into a suitable receptacle and the cores to be dropped into another receptacle.

What I claim is—

1. A machine of the class described, comprising a fruit guiding member, a tubular cutting knife disposed centrally with said fruit guiding member, a core holding mechanism disposed in said tubular cutting knife, means for reciprocating said fruit guiding member on said cutting knife, and means for rotating said cutting knife.

2. A machine of the class described, comprising a fruit guiding member, a tubular cutting knife disposed centrally with said fruit guiding member, a fruit holding mechanism disposed in said tubular cutting knife, a core ejecting mechanism associated with said fruit holding mechanism, means for reciprocating said fruit guiding member relative to said tubular cutting knife, means for reciprocating said core ejecting mechanism relative to said core holding mechanism, and means for rotating said tubular cutting knife.

3. A machine of the class described, comprising a fruit guiding member, a tubular cutting knife disposed centrally with said fruit guiding member, a fruit holding mechanism disposed in said tubular cutting knife, a core ejecting mechanism associated with said fruit guiding mechanism, means for reciprocating said core ejecting mechanism relative to said fruit holding mechanism, means for rotating said tubular cutting knife, a cover for said fruit guiding member and independent thereof, and means for rotating said fruit guiding member at predetermined intervals around said tubular cutting knife.

4. A machine of the class described, comprising a shaft, a casing mounted on said shaft, a plurality of fruit holders mounted on said casing, each of said fruit holders having associated therewith a coring knife, a a fruit guiding member, a pull on member, and a core ejecting mechanism, means for rotating said casing, and means for operating said coring knife, fruit guiding member, pull on member and core ejecting mechanism at predetermined intervals during the rotation of said casing.

5. In an apparatus of the class described, a fruit coring mechanism, a fruit holding mechanism disposed therein, and means for relatively rotating said fruit coring mechanism with respect to said fruit holding mechanism.

6. In an apparatus of the class described, a rotary tubular core cutting member, a fruit holding mechanism disposed therein, means to rotate said core cutting member with respect to said fruit holding mechanism, and a reciprocal fruit guiding member mounted on said tubular core cutting member.

7. In an apparatus of the class described, a rotary core cutting member and means to rotate the same, a fruit holding mechanism disposed in operable relation to said cutting member, a fruit guiding member mounted for reciprocal movement on said cutting member, and means for ejecting a fruit from said fruit guiding member and a severed core from said fruit holding mechanism after a movement of said core cutting member.

8. In an apparatus of the class described, a core severing member and operating means therefor, a fruit holding mechanism disposed adjacent said core cutting member, a fruit guiding means reciprocally mounted on said core cutting member, and means for ejecting a fruit from said fruit holding means and the severed core from said core holding mechanism after a movement of said core cutting member.

9. In an apparatus of the class described, a casing mounted for rotation, a plurality of pimiento receiving and guiding receptacles mounted on the periphery of said casing, pimiento coring and skin loosening mechanisms mounted adjacent each of said receptacles and communicating with their interiors, means for actuating said coring and skin loosening mechanisms, and means for rotating said casing.

10. In an apparatus of the class described, a casing mounted for rotation, a plurality of pimineto coring mechanisms mounted on said casing, means for actuating said coring mechanisms, and means for rotating said casing.

11. In an apparatus of the class described, a casing mounted for rotation, a plurality of pimiento coring and skin loosening mechanisms mounted in said casing and rotating therewith, means for actuating said coring and skin loosening mechanisms, and means to rotate said casing.

12. In an apparatus of the class described, a casing mounted for rotation, a plurality of pimiento receiving and guiding receptacles mounted on said casing, a plurality of coring and skin loosening mechanisms mounted in said casing, one for each receptacle, said mechanisms communicating with the interior of said receptacles, means to actuate said mechanisms, means to hold the pimientos in position during the coring and skin loosening operation, and means to rotate said casing.

13. In an apparatus of the class described, a frame, a shaft secured to said frame, a pulley mounted for rotation on said shaft, a casing provided with a plurality of coring mechanisms mounted for rotation around said shaft, a gear secured to said pulley engaging with said coring mechanisms, and speed changing gearing interposed between said pulley and casing.

In witness that I claim the foregoing I have hereunto subscribed my name this 23rd day of November, 1922.

CECIL J. WALDEN.